(12) United States Patent
Takagi

(10) Patent No.: US 10,626,923 B2
(45) Date of Patent: Apr. 21, 2020

(54) CENTRIFUGAL CLUTCH FITTING STRUCTURE IN VEHICLE

(71) Applicant: Kawasaki Jukogyo Kabushiki Kaisha, Kobe-shi, Hyogo (JP)

(72) Inventor: Jun Takagi, Himeji (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 191 days.

(21) Appl. No.: 15/867,541

(22) Filed: Jan. 10, 2018

(65) Prior Publication Data

US 2019/0211880 A1 Jul. 11, 2019

(51) Int. Cl.
  *F16D 1/033* (2006.01)
  *F16D 41/00* (2006.01)
  *F16D 43/00* (2006.01)

(52) U.S. Cl.
  CPC .............. *F16D 1/033* (2013.01); *F16D 41/00* (2013.01); *F16D 43/00* (2013.01)

(58) Field of Classification Search
  CPC .......... F16D 1/033; F16D 43/18; F16D 41/00; F16D 43/00
  See application file for complete search history.

(56) References Cited

U.S. PATENT DOCUMENTS 2,899,033 A * 8/1959 Bochory ................. F16D 43/18
  192/48.2
3,024,886 A * 3/1962 Peras ...................... F16D 43/18
  192/105 CE

* cited by examiner

*Primary Examiner* — Thomas C Diaz

(57) ABSTRACT

A hub of a centrifugal clutch is mounted to a crankshaft of an engine. The hub includes: a hub boss at a center of the hub; a hub flange contiguous to an outer periphery of the hub boss; and a clutch element held to the hub flange. The hub boss is fastened to one end portion of the crankshaft with a plurality of fastening members extending parallel to the rotary shaft.

7 Claims, 5 Drawing Sheets

PRIOR ART

CENTRIFUGAL CLUTCH FITTING STRUCTURE IN VEHICLE

BACKGROUND OF THE INVENTION

Field of the Invention

The present invention relates to a structure for mounting a hub of a centrifugal clutch to a rotary shaft of an engine for installation of the centrifugal clutch.

Description of Related Art

Referring to FIG. 6, in an engine of a vehicle, a hub 204 of a centrifugal clutch 202 is mounted to a rotary shaft 201 of the engine. The hub 204 includes a cylindrical hub boss 206 at a center of the hub 204, a hub flange 210 contiguous to an outer periphery of the hub boss 206, and a clutch element 208 held to the hub flange 210. One end portion 201a of the rotary shaft 201 is inserted through a hollow cavity 206a of the cylindrical hub boss 206, and a single nut 212 is threaded onto an externally threaded portion that is formed at one end of the rotary shaft 201 of the engine, thereby securing the hub 204 of the centrifugal clutch 202 to the one end portion 201a of the rotary shaft 201.

With such a structure for installation of the centrifugal clutch, however, there is a concern that the single nut 212 is loosened due to vibrations generated during vehicle travel and possible vibrations of the engine.

SUMMARY OF THE INVENTION

An object of the present invention is to provide a centrifugal clutch fitting structure, which can increase fastening strength with which a hub is fastened to a rotary shaft of an engine while avoiding accidental loosening of a fastening member used.

In order to achieve this object, the present invention provides a structure for mounting a hub of a centrifugal clutch to a rotary shaft of an engine for installation of the centrifugal clutch, with the hub including: a hub boss at a center of the hub; a hub flange contiguous to an outer periphery of the hub boss; and a clutch element held to the hub flange, and with the hub boss being fastened to one end of the rotary shaft with a plurality of fastening members extending parallel to the rotary shaft.

In such a configuration, the hub boss is fastened to the one end portion of the rotary shaft of the engine with the plurality of the fastening members. Thus, possible loosening of a single nut in the conventional art can be avoided while achieving increased fastening strength or increased axial fastening force.

In the present invention, four of the fastening members may be disposed equally spaced in a circumferential direction about an axis of the hub boss so as to be spaced apart uniform distances from one another. In such a configuration, the four fastening members disposed about an axis of the hub boss can enable the centrifugal clutch to be stably secured. In this case, each of the fastening members may include a bolt having a cylindrical head portion with a tool insertion hole. Such a configuration can allow a tool to enter even a narrower gap, thus making it easier to install the four fastening members in a limited space.

In the present invention, a knock pin for circumferential positioning may be disposed between the one end portion of the rotary shaft and one end portion of the hub boss that is brought into abutment therewith. With such a configuration, the hub boss is supported on the rotary shaft of the engine by means of a combination of the plurality of the fastening members and the knock pin, thus allowing the centrifugal clutch to be stably secured. Furthermore, the use of the knock pin can enhance the precision with which the hub boss is positioned relative to the rotary shaft of the engine.

In the present invention, the one end portion of the rotary shaft and one end portion of the hub boss that is brought into abutment therewith may define a spigot and socket structure. Such a configuration can allow an axis of the hub boss to precisely coincide with an axis of the rotary shaft of the engine.

In the present invention, the hub boss may have an oil hole formed therein, with the oil hole communicating with an oil passage formed in the rotary shaft and with the oil hole being configured to supply oil into the centrifugal clutch. Such a configuration can ensure that, by simply mounting the hub of the centrifugal clutch to the rotary shaft of the engine, a channel can be created that supplies oil into the centrifugal clutch.

In the present invention, a one-way clutch may be interposed between a clutch housing and the hub boss, with the clutch housing being couplable with the hub via the clutch element. In such a configuration, since the hub boss is rigidly supported on the rotary shaft of the engine, the one-way clutch can be stably mounted.

In the present invention, the hub boss and the hub flange may be of one-piece construction. Such a configuration can impart a greater strength to the hub, as compared with separately produced hub boss and hub flange that are subsequently jointed together. Furthermore, a step for performing a jointing operation can be omitted, thereby requiring less manufacturing steps.

Any combination of at least two features disclosed in the appended claims and/or the specification and/or the accompanying drawings should be construed as being included within the scope of the present invention. In particular, any combination of at least two claims from the appended claims should be equally construed as being included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference signs are used to denote like parts or corresponding parts throughout the different figures, and:

DESCRIPTION OF PREFERRED EMBODIMENTS

Figure 1:
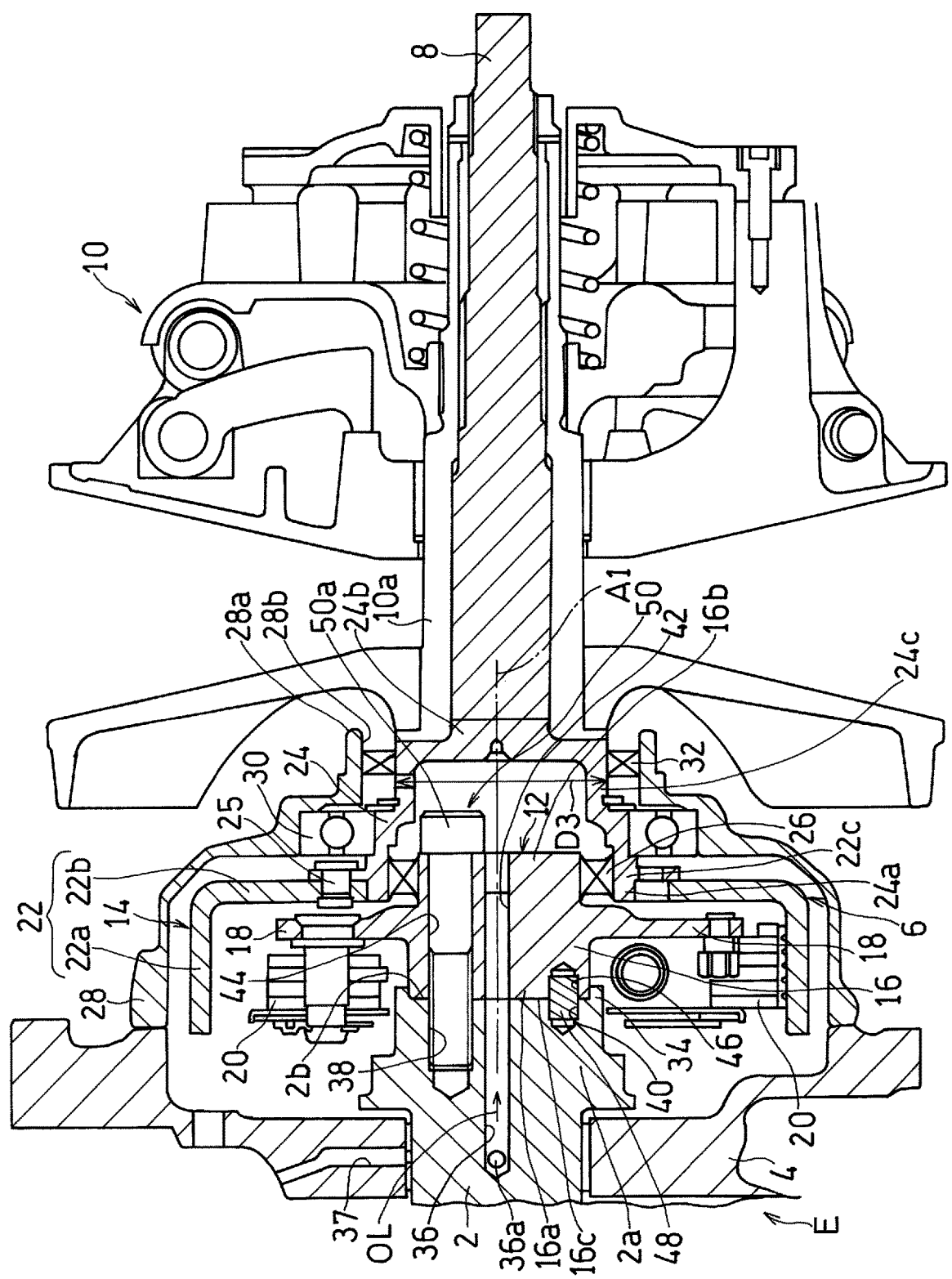
FIG. 1 is a longitudinal cross sectional view of a centrifugal clutch fitting structure, in accordance with a first embodiment of the present invention.

Preferred embodiments of the present invention will be described below with reference to the drawings. The first embodiment of the present invention which is illustrated in FIG. 1 can be used, for example, in an all-terrain vehicle which is also referred to as a four-wheeled buggy. However, a centrifugal clutch fitting structure according to the present invention may also be applied to an engine of a vehicle other than an all-terrain vehicle, or may even be applied to an engine of other than the engine for vehicle.

Referring to FIG. 1, an engine E includes a crankshaft 2 that forms a rotary shaft of the engine E and a crankcase 4 that rotatably supports the crankshaft 2. A centrifugal clutch 6 is coupled to one end portion 2a of the crankshaft 2. A transmission 10 is coupled to an output shaft 8 of the centrifugal clutch 6. Accordingly, the transmission 10 is connected via the centrifugal clutch 6 to the crankshaft 2. Although in the embodiment under discussion a Continuously Variable Transmission (CVT) is used as the transmission 10, the transmission 10 is not limited to a CVT.

The centrifugal clutch 6 includes a hub 12 that is mounted to the crankshaft 2 and a clutch housing 14 that accommodates the hub 12. The hub 12 includes a hub boss 16, a hub flange 18 and a clutch element 20. The hub boss 16 is cylindrical and has one end portion 16a which is mounted to the one end portion 2a of the crankshaft 2. An axis A1 of the hub boss 16 coincides with an axis of the crankshaft 2. A structure for installation of the centrifugal clutch will be discussed later in detail.

The hub flange 18 has a flange shape that extends radially outwards from an outer periphery of the hub boss 16. In the embodiment under discussion, the hub boss 16 and the hub flange 18 are of one-piece construction or of a unitary member. More specifically, in the embodiment under discussion, the hub boss 16 and the hub flange 18 are integrally formed together with each other by forging. However, as shown in a variant of FIG. 4, the hub boss 116 and the hub flange 118 may be separately produced and subsequently jointed together at welds W1, W2.

Referring to FIG. 1, the clutch element 20 is held to the hub flange 18. The clutch element 20 may include, for example, a clutch shoe. The clutch element 20 is disposed radially outwards with respect to the hub boss 16. There are provided a plurality of clutch elements 50 (in the embodiment under discussion, three) that are disposed so as to be spaced from each other in a circumferential direction.

The clutch housing 14 includes a first bowl segment 22 of larger diameter and a second bowl segment 24 of smaller diameter. The first bowl segment 22 of larger diameter and the second bowl segment 24 of smaller diameter are coaxial with each other, and an axis of the first and second bowl segments 22 and 24 coincides with the axis A1 of the hub boss 16. The first bowl segment 22 is open at one end (i.e. an end proximal to the crankshaft 2), and the hub flange 18 and the clutch element 20 are located in an interior of the first bowl segment 22. Rotation of the hub 12 creates a centrifugal force that causes the clutch element 20 to extend radially outwards and to contact a circumferential wall 22a of the first bowl segment 22. In this way, coupling is made between the hub 12 and the clutch housing 14.

An upper side clutch element 20 in FIG. 1 is illustrated in a condition with a stationary state of the hub 12 and a lower side clutch element 20 is illustrated in a condition with the clutch element 20 being coupled with the clutch housing 14 while the hub 12 rotates.

A bottom wall 22b of the first bowl segment 22 on the other end (i.e. an end proximal to the output shaft 8) axially confronts the hub flange 18. Therefore, portions of the hub boss 16 that are closer to the crankshaft 2 than the hub flange 18 are accommodated in an interior of the first bowl segment 22. The bottom wall 22b of the first bowl segment 22 has an axially oriented opening 22c formed therein. One end portion 24a of the second bowl segment 24 is fittedly mounted into the opening 22c.

The one end portion 24a of the second bowl segment 24 is an axially oriented open end, while the one end portion 24a of the second bowl segment 24 is inserted into the opening 22c of the first bowl segment 22, the one end portion 24a of the second bowl segment 24 and the bottom wall 22b of the first bowl segment 22 are coupled together with coupling elements 25 such as rivets. However, the first bowl segment 22 and the second bowl segment 24 may be of one-piece construction. The other end portion 16b of the hub boss 16 that is closer to the output shaft 8 than the hub flange 18 is accommodated in an interior of the second bowl segment 24.

At the other end of the second bowl segment 24, the second bowl segment 24 has a bottom wall 24b to which the output shaft 8 is coupled. An axis of the output shaft 8 also coincides with the axis A1 of the hub boss 16. The second bowl segment 24 and the output shaft 8 may be of one-piece construction or may be separately produced. The output shaft 8 has an outer peripheral surface to which an input shaft 10a of the transmission 10 is splinedly mounted.

An annular one-way clutch 26 is interposed between the second bowl segment 24 of the clutch housing 14 and the other end portion 16b of the hub boss 16. The one-way clutch 26 is designed to limit torque which may be transmitted from the output shaft 8.

A clutch cover 28 is detachably mounted to the crankcase 4. The clutch cover 28 is positioned radially outwards with respect to the clutch housing 14 and surrounds the clutch housing 14. An outward end 28a (i.e. an end distal to the crankcase 4) of the clutch cover 28 is formed of an open end, from which the output shaft 8 protrudes.

A bearing 30 is interposed between the clutch housing 14 and the clutch cover 28. Accordingly, both the clutch housing 14 and the output shaft 8 are rotatably supported via the bearing 30 by the clutch cover 28. In the embodiment under discussion, a rolling contact bearing is used as the bearing 30. However, the bearing 30 is not limited to a rolling contact bearing.

An annular oil seal 32 is interposed between the outward end 28a of the clutch cover 28 and the second bowl segment 24 of the clutch housing 14. In the embodiment under discussion, the oil seal 32 may be made of fluoro-rubber. However, material of the oil seal 32 is not limited to fluoro-rubber.

When the crankshaft 2 and the hub 12 coupled to the crankshaft 2 rotate, a centrifugal force is created that causes the clutch element 20 to extend radially outwards and to couple to the clutch housing 14. This, in turn, allows the clutch housing 14 and the output shaft 8 to rotate, thereby causing the input shaft 10a of the transmission 10, splinedly mounted to the output shaft 8, to rotate. In this way, rotation of the crankshaft 2 of the engine E can be transmitted to the transmission 10. A structure for installation of the centrifugal clutch 6 will now be discussed. The crankshaft 2 has one end face 2b formed with an annular projection 34. The projection 34 is formed on the one end face 2b of the crankshaft 2 at an outer peripheral edge of the one end face 2b and projects in an axial direction of the crankshaft 2. An oil passage 36 is formed in the crankshaft 2 at the one end 2a, which oil passage 36 is configured to supply oil OL towards the centrifugal clutch 6. The oil passage 36 is formed in the one end portion 2a of the crankshaft 2 at a center of the one end portion 2a. An upstream end of the oil passage 36 is in communication with an oil passage 37 formed in the crankcase 4. A downstream end of the oil passage 36 opens at the one end face 2b of the crankshaft 2.

Figure 2:
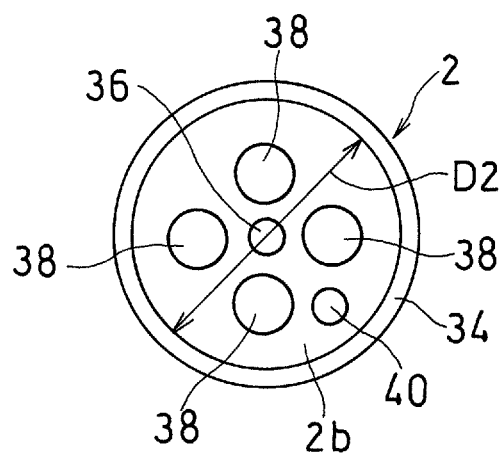
FIG. 2 is a side view of one end face of a crankshaft of the centrifugal clutch fitting structure.

The one end face 2b of the crankshaft 2 has a plurality of axially oriented threaded holes 38 formed therein. In the embodiment under discussion, four threaded holes 38 are provided. More specifically, the four threaded holes 38 are arranged about an axis of the crankshaft 2 so as to be equally spaced in a circumferential direction (i.e. by equal angles), as shown in FIG. 2. However, the number of the threaded holes 38 is not limited to four. Furthermore, the one end face 2b of the crankshaft 2 also has an axially oriented, first pin insertion hole 40 formed therein.

Referring to FIG. 1, the hub boss 16 has an oil hole 42 formed therein, which oil hole 42 extends in the axial direction A1. The oil hole 42 is formed in the hub boss 16 at a center thereof. An upstream end of the oil hole 42 opens at one end face 16c of the hub boss 16. When the hub boss 16 is mounted to the crankshaft 2, the oil hole 42 at the upstream end thereof communicates with the oil passage 36 formed in the crankshaft 2. The oil hole 42 at a downstream end thereof opens at the other end portion 16b of the hub boss 16. Accordingly, the oil hole 42 transports or supplies the oil OL from the oil passage 36 of the crankshaft 2 into the centrifugal clutch 6. The oil OL introduced into the centrifugal clutch 6 lubricates, for example, the one-way clutch 26 and the bearing 30.

Figure 3:
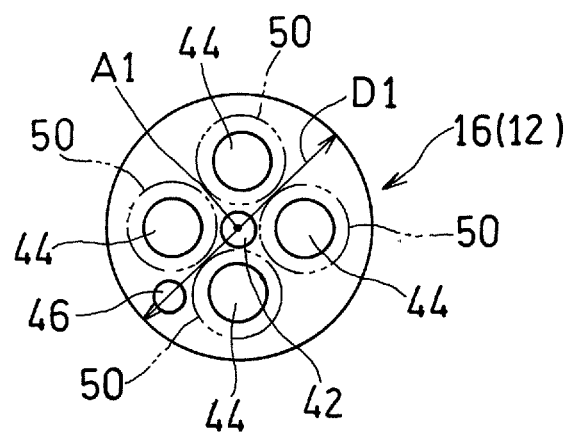
FIG. 3 is a side view of one end face of a hub of the centrifugal clutch fitting structure.

The hub boss 16 has a plurality of axially extending bolt insertion holes 44 formed therein. Each of the bolt insertion holes 44 is associated with a corresponding one of the threaded holes 38 of the crankshaft 2. Therefore, in the embodiment under discussion, the number of the bolt insertion holes 44 is the same as that of the threaded holes 38, namely, four. More specifically, the bolt insertion holes 44 are arranged about the axis A1 so as to be equally spaced in the circumferential direction, as shown in FIG. 3. Furthermore, the hub boss 16 has one end face 16c thereof (FIG. 1) formed with a second pin insertion hole 46, which is oriented in the axial direction A1. The second pin insertion hole 46 is associated with the first pin insertion hole 40 (FIG. 1) of the crankshaft 2. An outer diameter D1 of the hub boss 16 at the one end face 16c thereof is designed to be slightly smaller than an inner diameter D2 of the projection 34 formed on the crankshaft 2 illustrated in FIG. 2.

A process of mounting the hub 12 of the centrifugal clutch 6 to the crankshaft 2 of the engine E is now explained. Referring to FIG. 1, one end of a knock pin 48 is firstly fitted into the first pin insertion hole 40 formed in the crankshaft 2. Then, the one end portion 16a of the hub boss 16 is fittedly mounted into an inner surface of the projection 34 formed on the crankshaft 2. Thus, the one end portion 16a of the hub boss 16 is fitted inside the projection 34a formed on the crankshaft 2 at the one end portion 2a of the crankshaft 2 in a substantially tight manner, thereby realizing a spigot and socket structure. This can allow the axis A1 of the hub boss 16 to precisely coincide with an axis of the crankshaft 2.

Here, the other end of the knock pin 48 is fitted into the second pin insertion hole 46 formed in the hub boss 16. This knock pin 48 can enhance the precision with which the hub boss 16 is circumferentially positioned relative to the crankshaft 2.

In addition, fastening elements or fastening members 50 are inserted, along a direction parallel to the axis A1, into the bolt insertion holes 44 formed in the hub boss 16 and are then fastened into the threaded holes 38 formed in the crankshaft 2. Accordingly, the hub boss 16 is fastened to the one end portion 2a of the crankshaft 2 by means of the plurality of the fastening members 50 that define axes extending parallel to the crankshaft 2. In the embodiment under discussion, each of the fastening members 50 is formed of an Allen bolt with a small seating surface, each of which fastening members 50 has a cylindrical head portion 50a with a hexagonal hole formed therein to which a tool (hexagon socket screw key or alien key) can be inserted. However, a fastening member 50 is not limited to an Allen bolt. It is as a result of this installation that the oil hole 42 formed in the hub boss 16 communicates with the oil passage 36 formed in the crankshaft 2.

Figure 6:
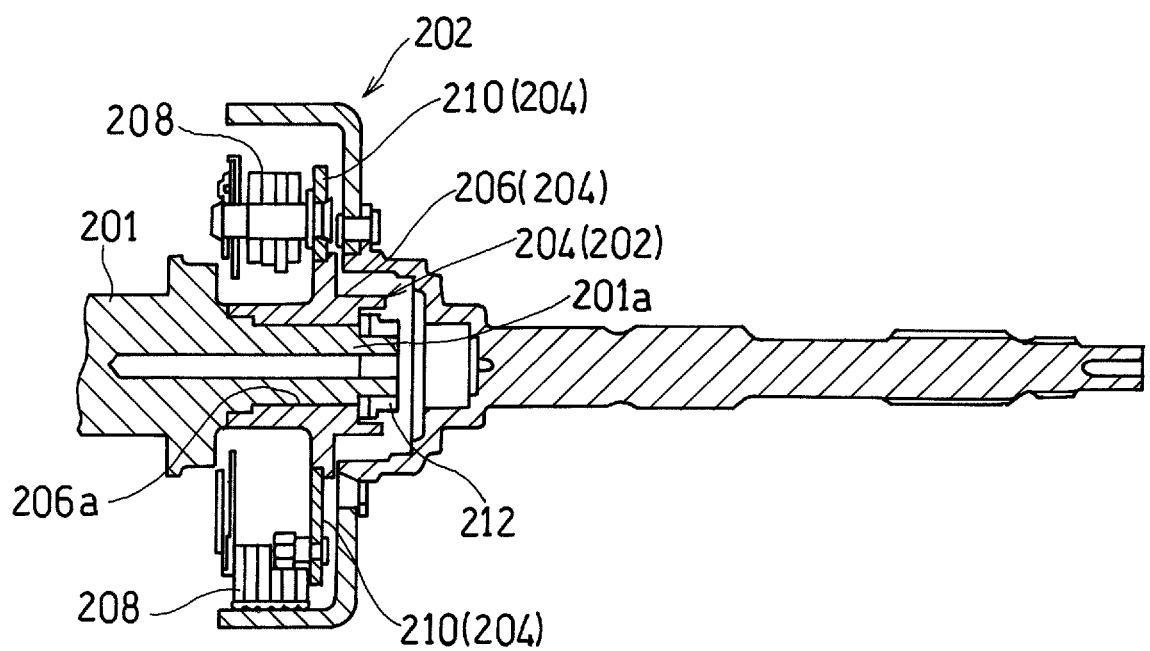
FIG. 6 is a cross sectional view of a conventional centrifugal clutch fitting structure.

In such a configuration of the embodiment that has been described, the hub boss 16 is fastened to the crankshaft 2 with the plurality of the fastening members 50. In this way, possible loosening of a single nut 212 (FIG. 6) in the conventional art can be avoided while achieving increased fastening strength or increased axial fastening force. Accordingly, the hub boss 16 can be stably supported on the crankshaft 2. Moreover, since the hub boss 16 is rigidly supported on the crankshaft 2, the one-way clutch 26 can be stably mounted.

As shown in FIG. 3, the fastening members 50 are disposed about the axis A1 of the hub boss 16 so as to be equally spaced in the circumferential direction. Therefore, the hub boss 16 and the crankshaft 2 are coupled together via mutual surface contact that is made possible by the fastening members 50, unlike in a conventional structure, illustrated in FIG. 6, where it is the single nut 212 that carries out fixation. This can enable the centrifugal clutch 6 to be stably secured to the crankshaft 2.

Arrangement of the four fastening members 50 about the axis A1 of the hub boss 16 so as to be equally spaced in the circumferential direction requires clearance to be established between the head portion 50a of each of the fastening members 50 and the second bowl segment 24 of the clutch housing 14. For establishment of such a clearance, a correspondingly larger diameter is chosen for a diameter D3 of the second bowl segment 24 of the clutch housing 14 at the other end portion 24c of the second bowl segment 24. This implies that a correspondingly larger diameter is also chosen for an inner diameter of the oil seal 32 interposed between the second bowl segment 24 and the clutch cover 28, resulting in increase of a circumferential velocity of the oil seal 32. In the embodiment under discussion, a conventional oil seal has been replaced with an oil seal 32 made of fluoro-rubber with a considerable heat resistance.

In the embodiment under discussion, the presence of the one-way clutch 26 interposed between the hub boss 16 and the clutch housing 14 imposes limitations on a radial dimension of the hub boss 16. Such a limited space makes it difficult to position the four fastening members 50. In the embodiment under discussion, however, an Allen bolt with a small seating surface (i.e. a bottom surface of the head portion 50a) is used as each of the fastening members 50, thus making it easier to install the four fastening members 50 in a limited space. Since this can also allow a tool (hexagon socket screw key) to enter even a narrower gap, the fastening members 50 positioned in such a narrow space can still be manipulated. Thus, a volume occupied by the fastening members 50 in the present embodiment does not exceed an inner diameter of the one-way clutch 26, while at the same time achieving the required fastening strength.

Figure 5:
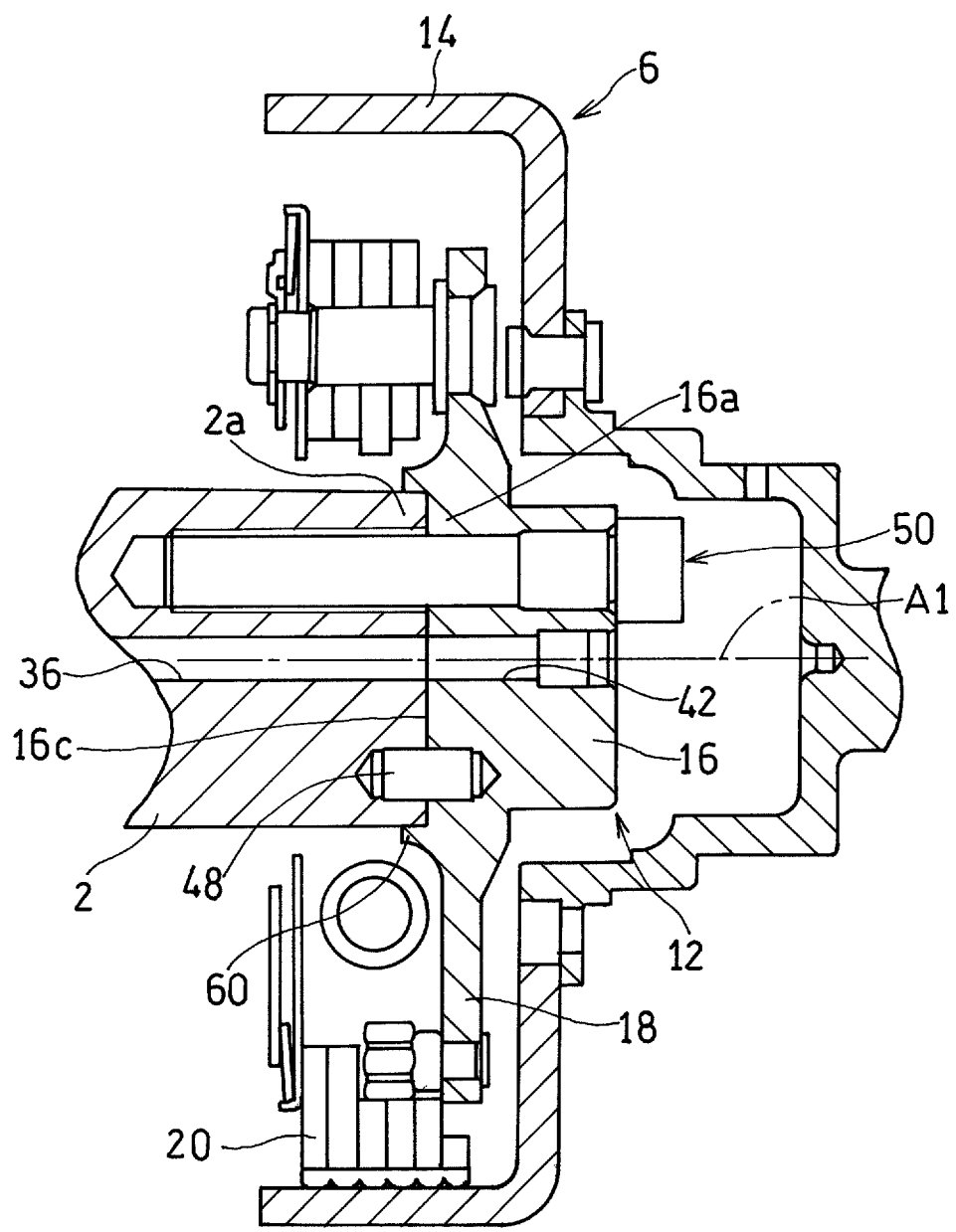
FIG. 5 is a cross sectional view of a centrifugal clutch fitting structure, in accordance with another variant of the present invention.

The one end portion 2a of the crankshaft 2 and the one end portion 16a of the hub boss 16 define a spigot and socket structure. This can allow the axis A1 of the hub boss 16 to precisely coincide with an axis of the crankshaft 2. It is to be noted that the spigot and socket structure is not limited to that of the present embodiment. Specifically, as shown in a variant of FIG. 5, the projection 34 may be omitted, and the one end face 16c of the hub boss 16 may be formed with an annular projection 60 at an outer peripheral edge thereof, which projection 60 projects in the axial direction of the hub boss 16. In this case, the one end portion 2a of the crankshaft 2 may be fitted inside the projection 60. Even with the variant of the FIG. 5, the axis A1 of the hub boss 16 can be precisely coincided with the axis of the crankshaft 2.

Furthermore, the knock pin 48 shown in FIG. 1 is disposed between the one end portion 2a of the crankshaft and the one end portion 16a of the hub boss 16. This may enhance the precision with which the hub boss 16 is circumferentially positioned relative to the crankshaft 2. Therefore, the mountability of the hub 12 to the crankshaft 2 can be improved. Furthermore, the hub boss 16 is supported on the crankshaft 2 by means of a combination of the plurality of the fastening members 50 and the knock pin 48, thus further stabilizing the support of the centrifugal clutch 6.

In addition, the hub boss 16 has the oil hole 42 formed therein, which oil hole 42 communicates with the oil passage 36 formed in the crankshaft 2. This can ensure that, by simply mounting the hub 12 of the centrifugal clutch 6 to the crankshaft 2, a channel can be created that supplies oil into the centrifugal clutch 6.

In the embodiment that has been described, the hub boss 16 and the hub flange 18 are formed in one piece that is produced by forging. In contrast, in a variant shown in FIG. 4, the hub boss 116 and the hub flange 118 are separately produced and both of them 116, 118 are subsequently jointed together at the welds W1, W2. If the junction is only subjected to small loads, a plate thickness T of the hub flange 118 may be thinner and only one annular weld W1 may be required for a welding site. However, if the junction is subjected to greater loads, the plate thickness T of the hub flange 118 may need to be increased and more welding sites such as the two annular welds W1, W2 may be necessary. As a result, the manufacturing cost may increase.

Figure 4:
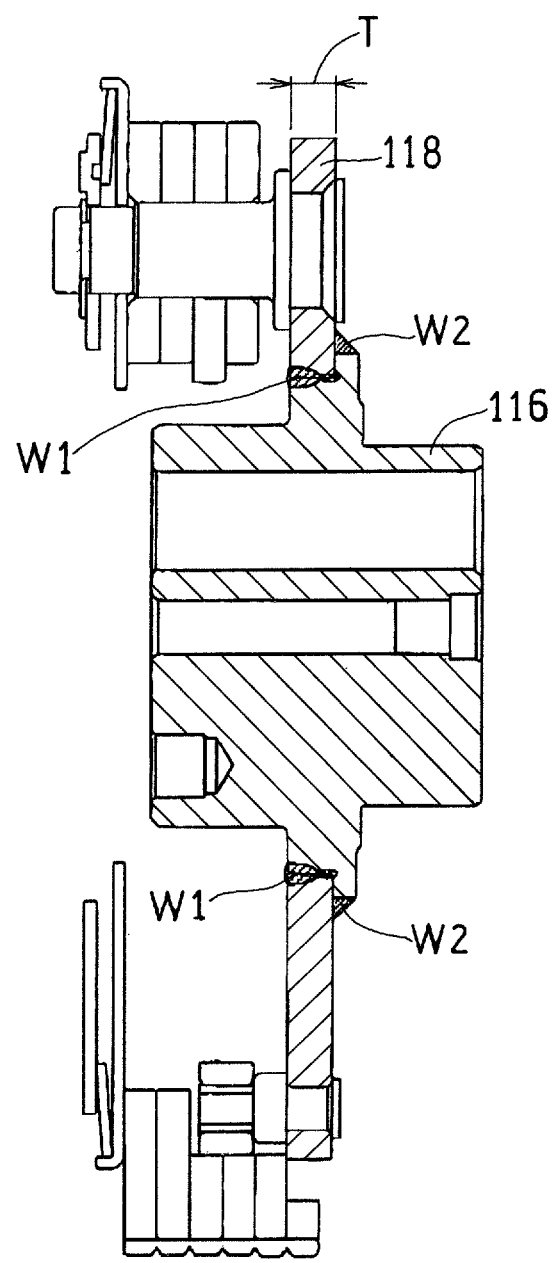
FIG. 4 is a cross sectional view of a centrifugal clutch fitting structure, in accordance with a variant of the present invention.

Forming the hub boss 16 and the hub flange 18 in one piece that is shaped by forging, such as in the embodiment illustrated in FIGS. 1 to 3, can impart a greater strength to the hub 12, as compared with separately produced hub boss 116 and hub flange 118 that are subsequently jointed together, such as shown in a variant of FIG. 4. By imparting a greater strength to the hub 12, the one-way clutch 26 can be stably supported. Furthermore, a step for performing a jointing operation can be omitted, thereby requiring less manufacturing steps.

It should be noted that those embodiments described herein only represent merely illustrative, non-limiting examples of the present invention. Numerous additions, modifications and omissions are possible without departing from the scope of the present invention. Accordingly, all of such additions, modifications and omissions should be construed to be encompassed by the scope of the present invention.

REFERENCE NUMERALS

2 . . . crankshaft (rotary shaft)
2a . . . one end portion of crankshaft
6 . . . centrifugal clutch
12 . . . hub
14 . . . clutch housing
16 . . . hub boss
16a . . . one end portion of hub boss
18 . . . hub flange
20 . . . clutch element
26 . . . one-way clutch
36 . . . oil passage
42 . . . oil hole
48 . . . knock pin
50 . . . fastening member
E . . . engine

What is claimed is:

1. A centrifugal clutch fitting structure for mounting a hub of a centrifugal clutch to a rotary shaft of an engine, wherein
the hub includes: a hub boss at a center of the hub; a hub flange contiguous to an outer periphery of the hub boss; and a clutch element held to the hub flange, and
the hub boss is fastened to one end portion of the rotary shaft with a plurality of fastening members extending parallel to the rotary shaft;
wherein the hub boss has an oil hole formed therein, the oil hole communicating with an oil passage formed in the rotary shaft, the oil hole being configured to supply oil into the centrifugal clutch.

2. The centrifugal clutch fitting structure as claimed in claim 1, wherein four of the fastening members are disposed equally spaced in a circumferential direction about an axis of the hub boss.

3. The centrifugal clutch fitting structure as claimed in claim 2, wherein each of the fastening members comprises a bolt having a cylindrical head portion with a tool insertion hole.

4. The centrifugal clutch fitting structure as claimed in claim 1, wherein a knock pin for circumferential positioning is disposed between the one end portion of the rotary shaft and one end portion of the hub boss that is brought into abutment therewith.

5. The centrifugal clutch fitting structure as claimed in claim 1, wherein the one end portion of the rotary shaft and one end portion of the hub boss that is brought into abutment therewith define a spigot and socket structure.

6. The centrifugal clutch fitting structure as claimed in claim 1, further comprising: a clutch housing couplable with the hub via the clutch element; and a one-way clutch interposed between the clutch housing and the hub boss.

7. The centrifugal clutch fitting structure as claimed in claim 1, wherein the hub boss and the hub flange are of one-piece construction.

* * * * *